United States Patent
Fritz et al.

(10) Patent No.: US 10,352,259 B2
(45) Date of Patent: Jul. 16, 2019

(54) DUAL-FUEL INTERNAL COMBUSTION ENGINE

(71) Applicant: INNIO Jenbacher GmbH Co OG, Jenbach (AT)

(72) Inventors: Jassin Marcel Fritz, Munich (DE); Dino Imhof, Baden (CH); Georg Tinschmann, Schwaz (AT); Christian Trapp, Hall in Tirol (AT)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 15/568,764

(22) PCT Filed: Apr. 20, 2016

(86) PCT No.: PCT/AT2016/050103
§ 371 (c)(1),
(2) Date: Oct. 23, 2017

(87) PCT Pub. No.: WO2016/168875
PCT Pub. Date: Oct. 27, 2016

(65) Prior Publication Data
US 2018/0087461 A1 Mar. 29, 2018

(30) Foreign Application Priority Data
Apr. 21, 2015 (AT) .................... 238/2015

(51) Int. Cl.
*F02D 19/06* (2006.01)
*F02D 41/00* (2006.01)
(Continued)

(52) U.S. Cl.
CPC ....... *F02D 41/0027* (2013.01); *F02D 19/061* (2013.01); *F02D 19/0628* (2013.01);
(Continued)

(58) Field of Classification Search
CPC ............. F02D 41/0027; F02D 41/0025; F02D 19/024; F02D 19/027; F02D 19/061;
(Continued)

(56) References Cited

U.S. PATENT DOCUMENTS 6,240,910 B1 * 6/2001 Maekawa ........... F02D 41/0027
123/198 D
7,100,577 B2 * 9/2006 Mumford ........... F02M 51/0603
123/447
(Continued)

FOREIGN PATENT DOCUMENTS

DE 19621297 C1 12/1997
DE 10 2006 048498 A1 4/2008
(Continued)

OTHER PUBLICATIONS

"15-568764 Daimler Translation DE-10-2006-048498" is a computer translation of DE102006048498.*
(Continued)

*Primary Examiner* — Hai H Huynh
*Assistant Examiner* — Gonzalo Laguarda
(74) *Attorney, Agent, or Firm* — Fletcher Yoder, P.C.

(57) ABSTRACT

A dual-fuel internal combustion engine with a device for regulating the internal combustion engine, with at least two piston-cylinders, a fuel injector assigned to the piston-cylinder units for a liquid fuel, which has an injector needle. Each piston-cylinder unit has a gas supply device for fuel, wherein the regulating device controls the fuel injector and the at least one gas supply device individually for metering of the quantity of the liquid or gaseous fuel supplied to each piston-cylinder unit. At least one needle sensor is connected to the regulating device and assigned to the respective piston-cylinder unit, which detects a characteristic signal of the needle position in the ballistic range, so that the fuel (Continued)

injector can be operated with individual controllability for each of the at least two piston-cylinder units for the regulation of the supplied fuel quantity in the ballistic range.

15 Claims, 4 Drawing Sheets

(51) Int. Cl.
*F02M 43/00* (2006.01)
*F02M 57/00* (2006.01)
*F02M 65/00* (2006.01)
*F02D 19/10* (2006.01)
F02D 41/20 (2006.01)
F02D 35/02 (2006.01)
F02B 75/18 (2006.01)
F02M 21/02 (2006.01)
F02M 61/10 (2006.01)

(52) U.S. Cl.
CPC ....... *F02D 19/0642* (2013.01); *F02D 19/105* (2013.01); *F02D 41/008* (2013.01); *F02D 41/0025* (2013.01); *F02M 43/00* (2013.01); *F02M 57/005* (2013.01); *F02M 65/005* (2013.01); *F02B 75/18* (2013.01); F02B 2075/1808 (2013.01); F02D 35/022 (2013.01); F02D 35/023 (2013.01); F02D 35/025 (2013.01); F02D 41/20 (2013.01); F02D 2200/063 (2013.01); F02D 2200/0616 (2013.01); F02M 21/023 (2013.01); F02M 61/10 (2013.01); F02M 2200/245 (2013.01); F02M 2200/247 (2013.01); *Y02T 10/32* (2013.01); *Y02T 10/36* (2013.01)

(58) Field of Classification Search
CPC ............. F02D 19/0642; F02D 19/0628; F02D 2041/224; Y02T 10/32; Y02T 10/36; F02M 2200/24; F02M 21/023; F02M 61/10; F02B 75/18; F02B 2075/1808
See application file for complete search history.

(56) References Cited

U.S. PATENT DOCUMENTS

| 8,671,911 | B2 | 3/2014 | Moren et al. |
| 8,973,553 | B2* | 3/2015 | Estefanous ........... F02D 35/028 123/294 |
| 2009/0070008 | A1 | 3/2009 | Batenburg et al. |
| 2014/0136080 | A1 | 5/2014 | Sivasubramanian et al. |
| 2018/0073447 | A1* | 3/2018 | Wickstone ........... F02M 45/083 |

FOREIGN PATENT DOCUMENTS

| DE | 102006048498 A1 * | 4/2008 | ........ F02D 19/0628 |
| EP | 1 925 814 A1 | 5/2008 | |
| EP | 2 653 706 A1 | 10/2013 | |
| EP | 2 703 634 A1 | 3/2014 | |
| EP | 3 032 077 A1 | 6/2016 | |
| WO | 2002/086302 A1 | 10/2002 | |
| WO | 2004/067946 A1 | 8/2004 | |
| WO | 2008/046486 A1 | 4/2008 | |
| WO | 2011/011378 A1 | 1/2011 | |
| WO | WO 2013156161 A1 * | 10/2013 | ............. F02D 1/221 |
| WO | 2014/106525 A1 | 7/2014 | |
| WO | 2005/121542 A1 | 12/2015 | |

OTHER PUBLICATIONS

Office Action and Search issued in connection with corresponding AT Application No. A 238/2015 dated Sep. 29, 2015.
Machine Translation and International Search Report and Written Opinion issued in connection with corresponding PCT Application No. PCT/AT2016/050103 dated Jul. 20, 2016.
Machine Translation and International Preliminary Report on Patentability issued in connection with corresponding PCT Application No. PCT/AT2016/050103 dated Oct. 24, 2017.

* cited by examiner

DUAL-FUEL INTERNAL COMBUSTION ENGINE

FIELD OF THE TECHNOLOGY

The invention relates to a dual-fuel internal combustion engine with the features of the preamble of claim 1 and a method for operating a dual-fuel internal combustion engine.

BACKGROUND OF THE INVENTION

Generic dual-fuel internal combustion engines are typically operated in two operating modes. We differentiate an operating mode with a primary liquid fuel supply ("liquid operation" for short; in the case of the use of diesel as a liquid fuel, it is called "diesel operation") and an operating mode with primarily gaseous fuel supply, in which the liquid fuel serves as a pilot fuel for initiating combustion (also called "pilot operation" or "ignition jet operation").

Whether liquid or pilot operation is selected can depend on various factors, such as the availability of fuel, economic considerations or legal requirements.

It is also known that a pilot mode can be changed to a liquid mode if the quality of the gaseous fuel decreases.

In addition, there are also mixed operations, in which the quantities of gaseous and liquid fuel are comparable.

The disadvantage to date was that it was not readily possible to safely meter even small quantities of liquid fuel, but this is necessary in pilot operation. For this purpose, either two different fuel injectors must be provided for the liquid fuel (one for larger quantities of liquid fuel and one for smaller quantities of liquid fuel), or a single fuel injector with two injector needles must be used (see e.g. WO 2014/106525 A 1).

BRIEF DESCRIPTION OF THE INVENTION

An object of the invention is to provide a dual-fuel internal combustion engine and a method for operating a dual-fuel internal combustion engine in which the above-described disadvantageous measures are not required.

An embodiment of the invention includes a dual-fuel internal combustion engine with: a regulating device for regulating the internal combustion engine, at least two piston-cylinder units, at least one fuel injector for a liquid fuel, which is configured to at least one of the at least two piston-cylinder units, comprising an injector needle, which can assume different needle positions, at least one gas supply device for gaseous fuel associated with at least one of the at least two piston-cylinder units, wherein the regulating device is configured to individually control the at least one fuel injector and the at least one gas supply device for the selective metering of the quantity of liquid or gaseous fuel supplied to the at least two piston-cylinder units, wherein at least one needle sensor is provided for each piston cylinder unit, which is connected to the regulating device, which is configured to detect a signal characteristic of the needle position in the ballistic range, so that the fuel injector can be operated with individual controllability for each of the at least two piston-cylinder units for the regulation of the supplied fuel quantity in the ballistic range.

Since at least one needle sensor is provided, which is connected to the regulating device and assigned to the respective piston-cylinder unit, by means of which a signal characteristic of the needle position in the ballistic region can be detected, the fuel injector can be individually controlled to regulate the supplied fuel quantity for each of the at least two piston-cylinder units, because the supplied quantity of liquid fuel can be inferred for each and can thus also be regulated. The ballistic region of the needle sensor is understood to mean the region of the position of the injector needle between complete opening and complete closure. The resolution range of such a needle sensor can be between 20% and 50% of the nominal stroke of the injector needle.

According to an embodiment of the invention, it is provided that the internal combustion engine has at least two piston-cylinder units. More particularly, there are 12, 16, 20 or 24 piston-cylinder units. It is then provided, according to an embodiment of the invention, that at least one needle sensor is assigned to each of the at least two piston-cylinder units.

According to an embodiment of the invention, it is also provided that the regulating device is designed to regulate the quantities of liquid or gaseous fuel supplied to the at least two piston-cylinder units depending on the characteristic signals of the needle positions.

In this disclosure, the percentages in terms of fuel quantities refer to the quantities of fuel supplied by the respective fuel quantity of the piston-cylinder unit. For example, an indication of 1% liquid fuel means that 1% of the quantity of energy supplied to the piston-cylinder unit originates from the liquid fuel. In this example, the complementary 99% of the energy supplied is provided by the gaseous fuel. The energy quantity that corresponds to a mass flow of liquid or gaseous fuel supplied to the piston-cylinder unit is determined by the respective specific energy content of the fuels used.

Examples of liquid fuel are diesel and heavy fuel oil (HFO or—especially in the marine sector—BFO, bunker fuel oil). Examples of gaseous fuels are gaseous hydrocarbons, e.g. natural gas or biogas.

It is more particularly provided that, for each of the at least two piston-cylinder units, at least one combustion sensor is provided, which is connected to the regulating device and is assigned to the respective piston-cylinder unit, by means of which it is possible to detect a characteristic signal of a combustion occurring in the respective piston-cylinder unit.

In this case, it is more particularly provided that the regulating device is designed to individually regulate the quantities of the liquid or gaseous fuel supplied to the at least two piston-cylinder units depending on the characteristic signal of the respective needle position and the characteristic signal of the respective combustion.

If a characteristic signal of the combustion is also available, this makes it possible to take account of the course of the combustion in one of the at least two piston-cylinder units during a regulation of the dual-fuel internal combustion engine. It may be provided that the combustion sensor is a knock sensor, a cylinder pressure sensor, a temperature sensor (e.g. arranged in the combustion chamber or exhaust tract) or a NOx probe. In this way, for example, misfires, the occurrence of knocking and the emissions arising during combustion can be taken into account. The combustion can be controlled with knowledge of the cylinder pressure depending on the cylinder pressure. In contrast to the embodiment with only one needle sensor, this makes it possible to operate the dual-fuel internal combustion engine with higher efficiency and/or more favorable emissions.

It may be provided that the needle sensor and combustion sensor are designed separately from one another. Alternatively, it may be provided that the needle sensor and combustion sensor are designed as one and the same sensor.

Then it is suitable to design the sensor as a knock sensor (structure-borne sound sensor).

In an embodiment, one fuel injector for liquid fuel is provided for each piston-cylinder unit, which may have one injector needle.

It may be provided that the regulating device is designed to supply the quantity of liquid fuel supplied to the at least two piston-cylinder units in the range from 0.5% (lower limit of pilot operation) to 100% (upper limit of liquid operation) and to vary the quantity of gaseous fuel supplied individually to the at least two piston-cylinder units correspondingly in the range of 99.5% to 0%.

It may be provided that the regulating device is designed to individually regulate the quantity of gaseous fuel supplied to the at least two piston-cylinder units and the quantity of liquid fuel supplied to the at least two piston-cylinder units depending on a stored or calculated profile, whereby the profile defines a relationship between different operating states of the internal combustion engine and associated quantities of gaseous and liquid fuel. For example, with a given charge of the internal combustion engine and a predetermined emission limit, the optimal percentage fractions of liquid and gaseous fuel can be stored as a profile with respect to the efficiency. Of course, the proportions of liquid and gaseous fuel follow the specification of whether pilot operation, liquid operation or mixed operation with regard to the maximum gas quantity is to be used.

The use of the profile in an embodiment covers at least the stationary operation of the internal combustion engine. The transient regions can e.g. be operated with a fixed specification of the proportion of liquid and gaseous fuel.

EXAMPLE

In the case of a BMEP ("brake-mean effective pressure"—characteristic for the charge of the internal combustion engine) and a predetermined NOx emission limit with measured or known methane number and charge-air temperature, the target values of the operating parameters are determined for the maximum efficiency depending on injection start, injection duration, rail pressure and air ratio using a lookup table or in the form of a mathematical function. It should be noted that knocking or NOx emissions are also in an embodiment detected and, if necessary, changes are made to selected target values of the operating parameters in order to permit safe operation. If e.g. knocking is present, the quantity of gaseous fuel can be reduced and the quantity of liquid fuel or the injection time of the liquid fuel can be changed accordingly.

In particular for pilot operation, it is necessary to suspend a ballistic region of the injector needle by measuring technology means if a regulation of the internal combustion engine is to be performed. A ballistic region is understood to mean an operation of the fuel injector in which the injection needle moves from a "fully closed" position toward a "fully open" position, but without reaching it. As a result, the injection needle moves back toward the "fully closed" position without having reached the "fully open" position.

For example, a high-resolution sensor with respect to the injector needle path can be used, or a sensor known per se can be provided which detects the reaching of the "fully closed" position. The position of the injector needle can also be detected directly via an optical sensor.

According to an embodiment of the invention, a needle sensor is required, which can detect information beyond the binary information "fully open" or "fully closed".

It can be provided that the needle sensor is designed as a pressure sensor, a distance measuring device or an optical sensor arranged in the fuel injector. A pressure sensor can e.g. be arranged on a storage volume of the fuel injector connected to the injector needle.

In the case of an optical sensor, it can be oriented e.g. to the injector needle itself and determine the needle position directly by visual inspection. Alternatively, the optical sensor can be oriented toward the region adjacent to the fuel injector, in which the occurrence of a fuel spray is to be expected when the injector needle is opened.

The opening duration of the injector needle can be determined directly from the values of the needle sensor, and the actually injected quantity of liquid fuel can be calculated from the pressure at which the liquid fuel was injected via the fuel injector (rail pressure). By adjusting the duration of current of the fuel injector, this quantity can be regulated. By adjusting the opening and closing times of the fuel injector, the injection characteristics can be varied.

The needle sensor generates an additional signal to the already available current characteristic of the actuation of the fuel injector. Deviations can be detected between an expected opening from a current supply and the fuel injector and the actual opening, e.g. a lifting-off of the injector needle.

It may be provided that a cooling device for the fuel injector is provided. In this way, the coking of liquid fuel or increased wear on the fuel injector and material failure can be prevented. The cooling device can be designed e.g. as liquid cooling device.

It may be provided that the regulating device is designed to determine a wear characteristic of the needle sensor by means of the signal of the needle sensor which is characteristic of the needle position. For example, a duration of current of an actuator solenoid of the injector needle required for a defined supply of fuel relative to an opening duration of the injector needle can be monitored over time and an extension of the duration of current can be detected. This is an indication of wear.

While it is here formulated for the actuation of the fuel injector via a solenoid (a coil), the relationship also applies to alternative actuators, e.g. a piezo actuator.

In a method for operating a dual-fuel internal combustion engine, in particular according to one of the preceding embodiments, it is provided that the quantity of gaseous fuel supplied to at least two piston-cylinder units and the quantity of liquid fuel supplied to the piston-cylinder units is individually regulated depending on a position of an injector needle of a fuel injector of the respective piston-cylinder unit for the liquid fuel and depending on the occurrence of a combustion in the at least one piston-cylinder unit.

It may be provided that the quantity of liquid fuel supplied to the at least two piston-cylinder units is individually varied in the range from 0.5% to 100% and the quantity of gaseous fuel supplied to the at least two piston-cylinder units is individually varied correspondingly in the range of 99.5% to 0%.

It may be provided that the quantity of gaseous fuel supplied and the quantity of liquid fuel supplied to the at least two piston-cylinder units are regulated individually depending on a stored or calculated profile, whereby the profile defines a relationship between different operating states of the internal combustion engine and the associated quantities of gaseous and liquid fuel.

Simple examples include: when low ignitability of the mixture of air and gaseous fuel is detected, the quantity of the supplied liquid fuel is increased, when knocking is detected, the injection timing is adjusted so as to occur later, when a misfire is detected, the regulating device checks whether the injected quantity of liquid fuel was too low.

According to an embodiment of the invention, it is provided that at least two piston-cylinder units are provided, whereby, for each of the at least two piston-cylinder units, the quantity of gaseous fuel supplied and the quantity of liquid fuel supplied is controlled individually.

More particularly, the internal combustion engine according to an embodiment of the invention is a stationary internal combustion engine, which is used either directly as a mechanical drive or as a drive device for a generator for generating electrical energy in a so-called genset unit.

The cylinders of the piston-cylinder units more particularly have a bore diameter of at least 130 mm.

Some particular advantages of embodiments of the invention are summarized below: Fuel injector with feedback signal for the position of the injector needle of the needle sensor that allows reproducible imaging of very small quantities (so-called micropilot, less than 1% diesel/liquid fuel); Correction of the injection quantity over the lifetime of the fuel injector; High turndown ratio can be represented; High shot-to-shot accuracy (reproducibility of the injection quantities from one injection event to the next); and Fuel injector can be operated in a controllable manner in the ballistic region.

The turndown ratio is the ratio of the maximum to minimum fuel quantity that an injector can inject in a controlled manner. An injector that can present a fuel quantity of 0.5% to 100% has a turndown ratio of 200.

To correct the injection quantity over the lifetime of the fuel injector, it should be mentioned that an injection duration can be extended as well as shortened over the lifetime of a fuel injector due to wear and deposits. The needle sensor gives the possibility of detecting deviations in both directions.

BRIEF DESCRIPTION OF THE DRAWINGS

Further advantages and details of the invention are discussed with reference to the figures. The figures show the following.

DETAILED DESCRIPTION OF THE INVENTION

Figure 1:
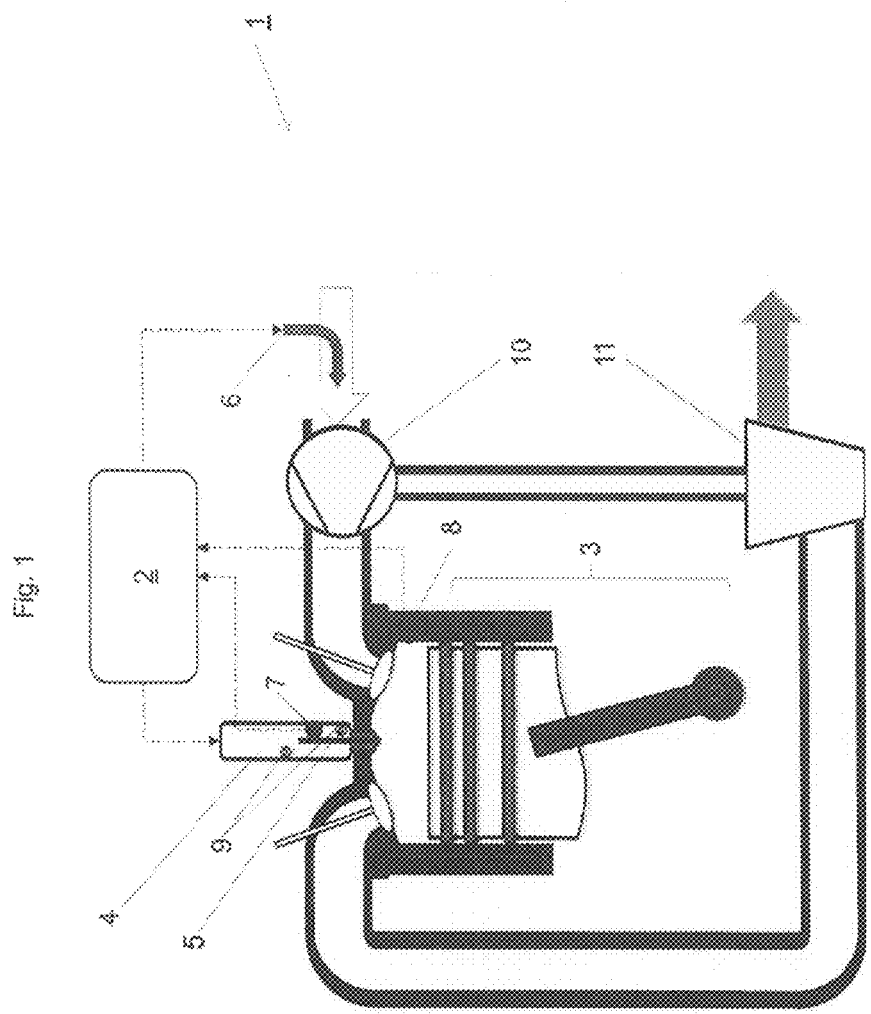
FIG. 1 a schematic representation of an internal combustion engine.

FIG. 1 shows schematically a piston-cylinder unit 3 of an internal combustion engine 1. A compression device 10 is connected via a shaft to an exhaust turbine 11, in which exhaust gases from the internal combustion engine 1 are expanded. The charge air or an air-fuel mixture to be supplied to the internal combustion engine 1 can be compressed via the compression device 10.

The piston-cylinder unit 3 of the internal combustion engine 1 can be supplied with gaseous fuel via a gas supply device 6 according to this exemplary embodiment upstream of the compression device 10. Since, in this variant, a mixture of air and fuel gas is compacted, this is called a mixture charge.

The piston-cylinder unit 3 can be supplied with liquid fuel, e.g. diesel, via the fuel injector 4.

The corresponding media lines for the liquid and gaseous fuel are not shown for the sake of clarity.

In this exemplary embodiment, the fuel injector 4 has exactly one injector needle 5. In addition, a cooling device 9 is designed in the fuel injector 4. This may be e.g. liquid cooling device. The fuel injector 4 also has a needle sensor 7, through which the needle position of the injector needle 5 can be indicated to a regulating device 2. The needle sensor 7 can e.g. be designed as a pressure sensor arranged in the fuel injector 4, as a distance measuring device or as an optical sensor.

A combustion sensor 8 is designed on piston-cylinder unit 3, from which signals which are characteristic of combustion can be transmitted to the regulating device 2. The combustion sensor 8 can be designed e.g. as a cylinder pressure sensor, a temperature sensor or an optical sensor. The quantities of liquid fuel supplied to the piston-cylinder unit 3 via the fuel injector 4 or the quantities of gaseous fuel supplied via the gas supply device 6 can be controlled or regulated via the regulating device 2.

The regulating device 2 can be implemented in a motor control of the internal combustion engine 1, or can be designed separately from it.

Figure 2:
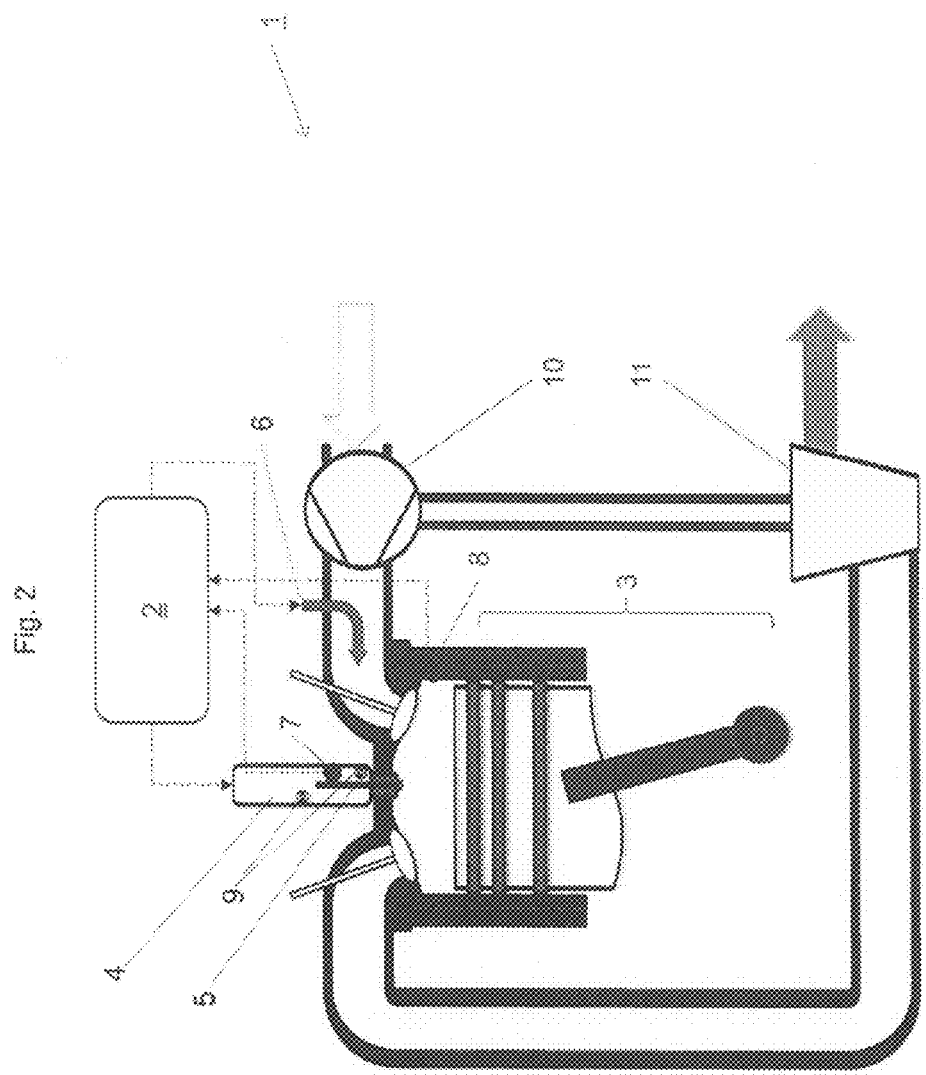
FIG. 2 a schematic representation of an internal combustion engine.

The embodiment shown in FIG. 2 differs from that in FIG. 1 in that the gas supply device 6 here is designed downstream of the compression device 10. In this case, therefore, the gaseous fuel is supplied directly upstream of the intake valve and downstream of the compression device 10, which in this case does not compress a mixture but rather charge air. This is referred to here as an air-charged concept; the gas supply device 6 can e.g. be designed as a port-injection (PI) valve. Such a valve gives the possibility of varying the gas supply in a cylinder-specific manner.

Figure 3:
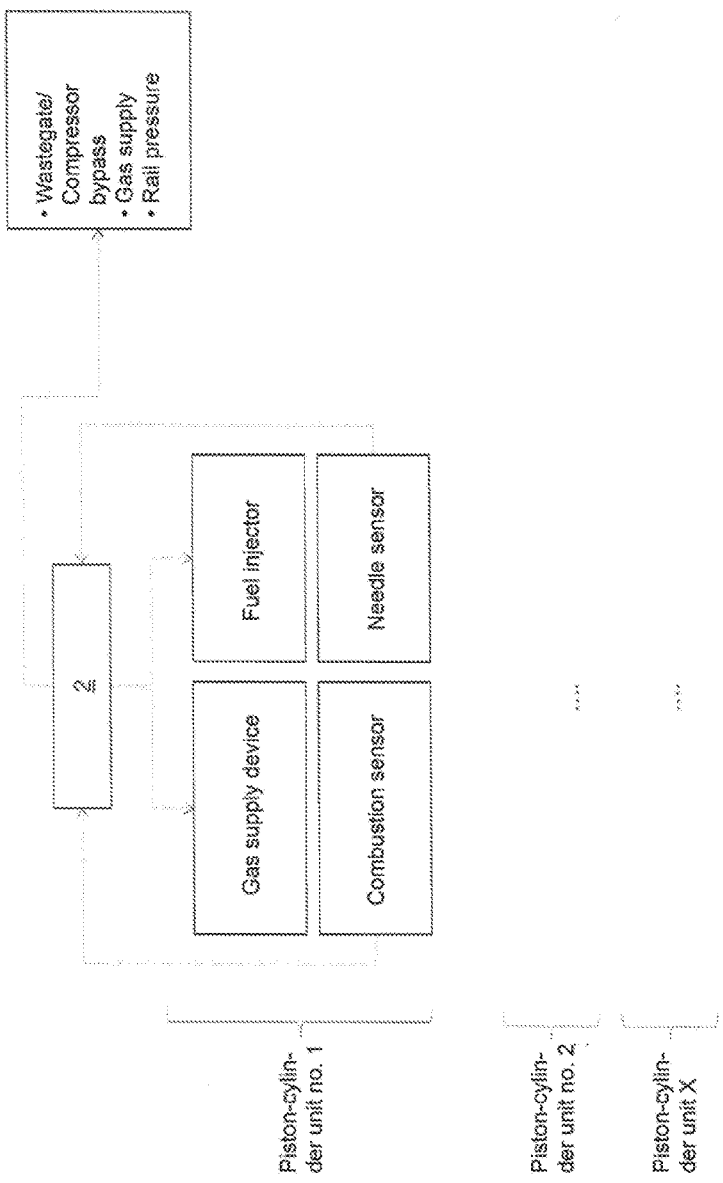
FIG. 3 a control diagram for an exemplary embodiment of the method

FIG. 3 shows a simplified control diagram to illustrate the method according to an embodiment of the invention. The gas supply device 6, combustion sensor 8, fuel injector 4 and needle sensor 7 for a piston-cylinder unit 3 designated as number 1 are shown as boxes. (There is therefore a plurality of piston-cylinder units 3.) The above-mentioned gas supply device, combustion sensor 8, fuel injector 4 and needle sensor 7 are more particularly applied in a plurality, and particularly in an embodiment in all of the piston-cylinder units 3 of the internal combustion engine 1.

The regulating device 2 firstly detects whether the internal combustion engine 1 is operating in dual-fuel mode.

For the sake of clarity, the principle for a single piston-cylinder unit 3 is shown. Information about the position of the injector needle 5 of the fuel injector 4 is transmitted to the regulating device 2 via the needle sensor 7. This information may include e.g. whether the injector needle 5 has reached its respective end positions, and how long it was in these end positions or between these end positions.

The combustion sensor 8 provides information about the combustion in the piston-cylinder unit 3. This information can be e.g. the duration of the combustion, the cylinder pressure or the cylinder temperature. Depending on the data transmitted from the combustion sensor 8 and the needle sensor 7, the regulating device 2 sends commands to the actuators, gas supply device 6 and fuel injector 4. The data transmitted to the fuel injector 4 can be e.g. a duration of current (DOC) or the start of current (SOC). These are common variables for determining the actuation characteristics of a fuel injector 4.

By means of feedback from the needle sensor 7, the regulating device 2 can then correct the values (SOC, DOC)

transmitted to the fuel injector 4 (SOC_cor, DOC_cor), e.g. when a deviation between the actual opening duration of the fuel injector 4 and the target opening period is determined.

The gas supply device 6 can receive commands from the regulating device 2 for opening or closing times and the duration of opening, thus yielding the supplied quantity of gaseous fuel.

Further variables controllable by the regulating device 2 are e.g. a compressor bypass or a waste-gate. Not instantaneously actuatable but suitable for compensating for slower changes are e.g. the adjustment of a pressure of the gas supply or the rail pressure of the liquid fuel. While the gas supply device 6 and the fuel injector 4 can be controlled in a cylinder-specific manner, the actuators waste-gate, compressor bypass, supply pressure of the gaseous fuel and rail pressure (of the liquid fuel) all relate to piston-cylinder unit 3 and therefore cannot be varied in a cylinder-specific manner.

Figure 4:
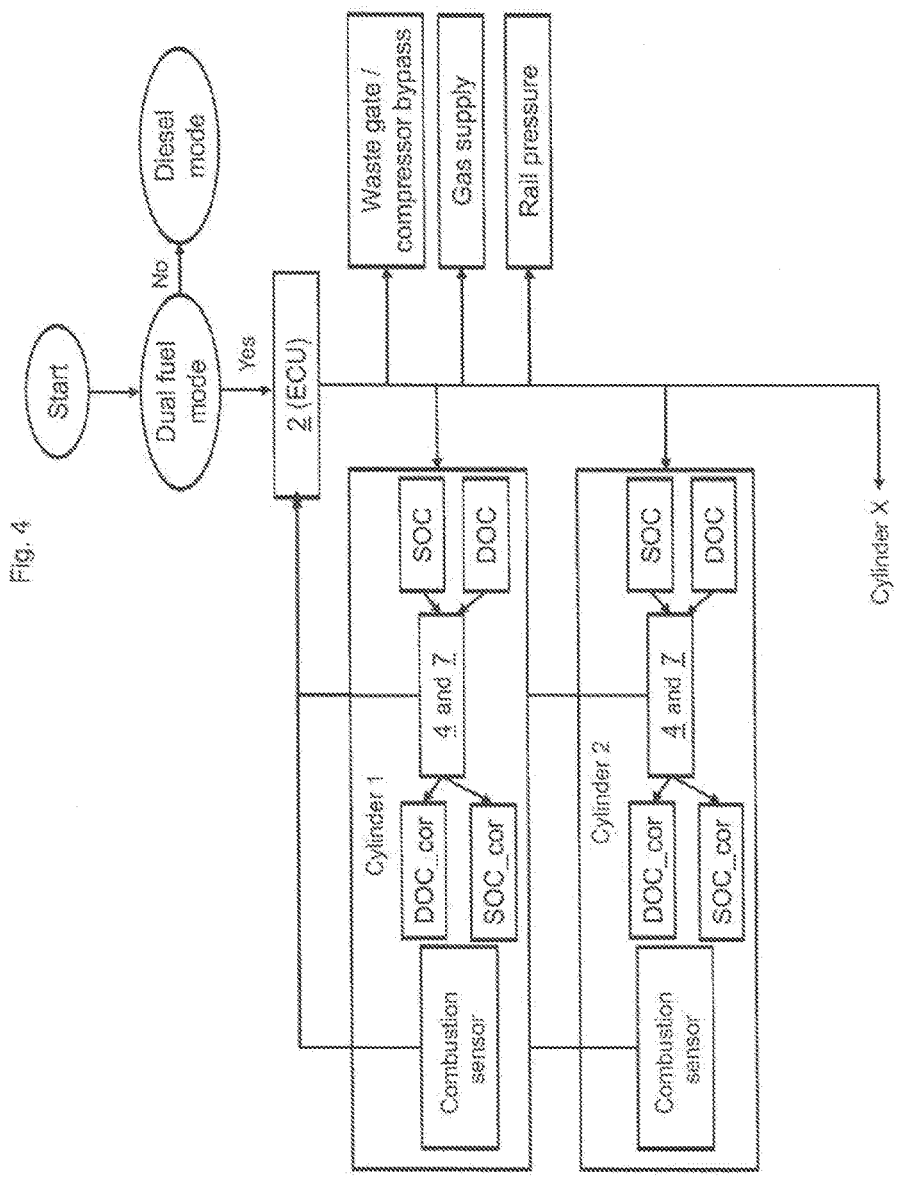
FIG. 4 Method for an individual piston-cylinder unit, a control diagram in an alternative representation.

FIG. 4 shows the control diagram of FIG. 3 in an alternative embodiment. First, at the start, it is determined whether the internal combustion engine 1 is operating in dual-fuel mode or diesel mode. In dual-fuel mode, the regulating device 2 (here called ECU) controls the actuation characteristics of the fuel injector 4 and/or, as the case may be, the gas supply device 6 for metering the gaseous fuel in a cylinder-specific manner depending on the signals received from the combustion sensor 8 and the needle sensor 7.

A cylinder-specific variation of the quantity of the supplied gaseous fuel can be implemented e.g. by a port-injection valve, as explained in the exemplary embodiment according to FIG. 2. An alternative to the cylinder-specific variation of the supplied gaseous fuel is a variable valve drive.

On the left-hand side of the diagram, the interconnection is illustrated by way of example for two piston-cylinder units 3 (here called cylinders 1 and 2). The elements or the regulating diagram are more particularly implemented for a plurality, particularly for all of the piston-cylinder units 3 of the internal combustion engine 1.

The functional unit of the fuel injector 4 and the needle sensor 7 receives from the regulating device 2 (ECU), on the one hand, the feedback from the needle sensor 7 about the actual actuation characteristics of the fuel injector 4, i.e. duration of opening, opening and closing times. On the other hand, the functional unit of the fuel injector 4 and the needle sensor 7 receives commands for actuating the fuel injector 4, e.g. the start of current (SOC) and a duration of current (DOC). From the feedback of the needle sensor 7, the regulating device 2 calculates and transmits the corrected values SOC_cor and DOC_cor, if necessary.

On the right-hand side of the diagram, the actuating variables are shown which do not have a cylinder-specific effect but relate to all of the piston-cylinder units 3 of the internal combustion engine 1.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dual-fuel internal combustion engine comprising:
a regulating device for regulating the internal combustion engine;
at least two piston-cylinder units;
at least one fuel injector for supply of a liquid fuel, configured to at least one of the at least two piston-cylinder units, the at least one fuel injector comprising an injector needle which can assume different needle positions;
at least one gas supply device for supply of a gaseous fuel associated with at least one of the at least two piston-cylinder units apart from the at least one fuel injector; and
at least one needle sensor provided for each of the at least two piston-cylinder units;
wherein the regulating device is configured to individually control the at least one fuel injector and the at least one gas supply device for selective metering of a quantity of liquid or gaseous fuel supplied to the at least two piston-cylinder units, wherein the at least one needle sensor provided for each of the at least two piston-cylinder units, is connected to the regulating device which is configured to detect a signal characteristic of a needle position in a ballistic range, enabling operation of the at least one fuel injector with individual controllability for each of the at least two piston-cylinder units for regulation of the quantity of fuel supplied in the ballistic range.

2. The internal combustion engine according to claim 1, further comprising at least one combustion sensor for each of the at least two piston-cylinder units, connected to the regulating device, assigned to a respective piston-cylinder unit of the at least two piston-cylinder units, and configured to detect a characteristic signal of a combustion occurring in the respective piston-cylinder unit.

3. The internal combustion engine according to claim 2, wherein the regulating device individually regulates the quantities of liquid or gaseous fuel supplied to the at least two piston-cylinder units depending on the characteristic signal of the needle position and the characteristic signal of the combustion.

4. The internal combustion engine according to claim 2, wherein the at least one needle sensor and the at least one combustion sensor are separately from each other.

5. The internal combustion engine according to claim 2, wherein the at least one combustion sensor is a knock sensor.

6. The internal combustion engine according to claim 1, wherein exactly one fuel injector for liquid fuel is provided for each piston-cylinder unit of the at least two piston-cylinder units, having exactly one injector needle.

7. The internal combustion engine according to claim 1, wherein the regulating device individually varies the quantity of liquid fuel supplied to the at least two piston-cylinder units in a range from 0.5% to 100% and varies the quantity of gaseous fuel supplied to the at least two piston-cylinder units correspondingly in a range of 99.5% to 0%.

8. The internal combustion engine according to claim 7, wherein the regulating device regulates the quantity of liquid or gaseous fuel supplied to the at least two piston-cylinder units and the quantity of the liquid fuel supplied to the at least two piston-cylinder units individually depending on a stored or calculated profile, wherein the profile defines a relationship between different operating states of the internal combustion engine and associated quantities of gaseous and liquid fuel.

9. The internal combustion engine according to claim 1, wherein the at least one needle sensor is a pressure sensor, a distance measuring device or an optical sensor arranged in the at least one fuel injector.

10. The internal combustion engine according to claim 2, wherein the at least one combustion sensor is a knock sensor, a cylinder pressure sensor, a temperature sensor or a NOx probe.

11. The internal combustion engine according to claim 1, further comprising a cooling device for the at least one fuel injector.

12. The internal combustion engine according to claim 1, wherein the regulating device determines a wear characteristic of the at least one needle sensor using the signal of the at least one needle sensor which is characteristic of the needle position.

13. A method for operating a dual-fuel internal combustion engine according to claim 1, the method comprising:
regulating the quantity of gaseous fuel supplied to the at least two piston-cylinder units and the quantity of liquid fuel supplied to the at least two piston-cylinder units individually, depending on the needle position of the injector needle of the at least one fuel injector for the liquid fuel, and depending on an occurrence of a combustion in the at least two piston-cylinder units.

14. The method according to claim 13, further comprising varying the quantity of liquid fuel supplied to the at least two piston-cylinder units individually, in a range from 0.5% to 100%, and varying the quantity of gaseous fuel supplied to the at least two piston-cylinder units, individually, correspondingly in a range of 99.5% to 0%.

15. The method according to claim 13, wherein the quantity of gaseous fuel supplied and the quantity of liquid fuel supplied to the at least two piston-cylinder units are regulated individually depending on a stored or calculated profile, wherein the profile defines a relationship between different operating states of the internal combustion engine and associated quantities of gaseous and liquid fuel.

* * * * *